Dec. 24, 1929.　　　K. C. AUGENSTEIN　　　1,740,885

BAND CHAIN

Filed May 12, 1928

INVENTOR.
Karl C. Augenstein.
BY Barlow & Barlow
ATTORNEYS.

Patented Dec. 24, 1929

1,740,885

UNITED STATES PATENT OFFICE

KARL C. AUGENSTEIN, OF CRANSTON, RHODE ISLAND, ASSIGNOR TO AUTOMATIC GOLD CHAIN CO., OF PROVIDENCE, RHODE ISLAND, A FIRM COMPOSED OF EDWIN F. M. SPEIDEL AND ALBERT E. R. SPEIDEL, BOTH OF EDGEWOOD, RHODE ISLAND.

BAND CHAIN

Application filed May 12, 1928. Serial No. 277,189.

This invention relates to a band chain; and has for its object to provide a flexible chain which may be made from sheet stock and of any desired width and length.

A further object of the invention is the provision of a chain which shall have the same general appearance as mesh fabric but which is formed from separate individual sheet metal links bent to be flexibly connected together.

A still further object of the invention is the provision of a plurality of links, each having a body with a plurality of laterally spaced arms which are formed to engage the body of the next link in spaces between the arms thereof to flexibly connect the links together.

With these and other objects in view, the invention consists of certain novel features of construction, as will be more fully described, and particularly pointed out in the appended claims.

The usual form of mesh chain is made from suitably formed wire and in some cases the coils or links are flattened out as desired. I have found, however, that it is desirable to provide a chain which has generally the same appearance as mesh chain but, which, instead of being formed from wire, is made from sheet metal stock with a plurality of links each of which has a transversely disposed body or bar with arms extending longitudinally therefrom to engage the body or bar of the next link between the arms thereof to hingedly connect the links together and I have found that this type of chain may be made of any desired width; and the following is a detailed description of the present embodiment of this invention and showing the preferred means by which these advantageous results may be accomplished.

Figure 2:
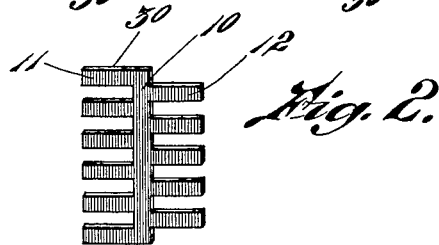
Figure 2 is a perspective view of one of the links in blanked out form.
Figure 3:
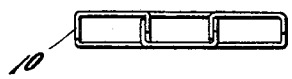
Figure 3 is a side elevation showing several of the links connected together.
Figure 4:
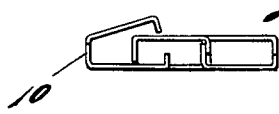
Figure 4 is a side elevation showing one of the links with its arms raised before being pressed into closed position.
Figure 5:
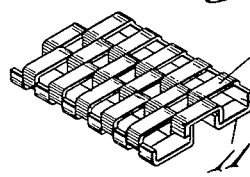
Figure 5 is a perspective view of one of the links folded partially into closed position.
Figure 6:
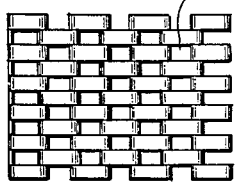
Figure 6 is a perspective view of several of the links in their connected relation.

With reference to the drawings, Figure 2 illustrates one of the links which is formed with a bar or body part 10 and arms 11 and 12 extending therefrom. These arms are bent with relation to the body 10 as illustrated in Figure 5 so that the arms 11 and 12 are in parallel planes with the arms 11 staggered with relation to the arms 12. Each of the arms 11 and 12 is bent inwardly at its ends to provide hook portions 13 and 14 which engage the body 10 of the next link in the spaces 15 between the arms thereof as illustrated in Figure 6 to hingedly connect the links of the chain together.

In the form which I have described and illustrated the staggering of the arms 11 and 12 forms a construction by which the openings in the top of the band are closed by the arms in the bottom of the band whereby from a top view no openings are visible directly through the chain.

Figure 7:
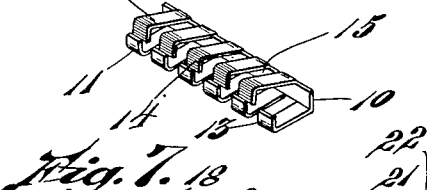
Figures 7 and 8 are perspective views of modified forms of links.
Figure 8:
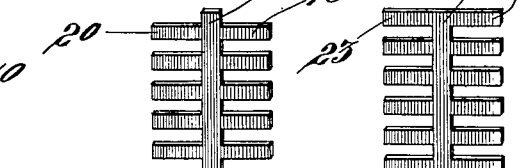
Figures 9, 10:
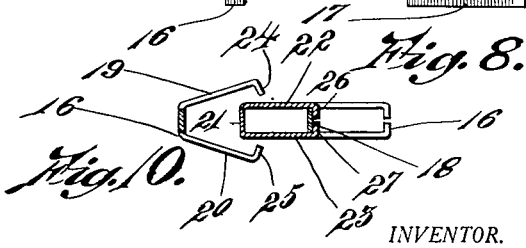
Figure 9 is a top plan view of the links shown in Figures 7 and 8 connected together.
Figure 10 is a sectional side view of the chain formed from the modified links and showing one of the links as it appears before being folded into final position.

In Figures 7 and 8, I have modified the relation of the arm to the body in which two co-operating different forms of links 16 and 17 are formed. The link 16 has a body part 18 with arms 19 and 20 extending therefrom while link 17 has a body part 21 with arms 22 and 23 extending therefrom. The arms of each link are in line with each other as illustrated in Figures 7 and 8.

These two links are assembled by folding of the arms with relation to the body in a manner similar to that illustrated in Figure 5 and hooks or inturned portions 24 and 25 are formed on the arms 19 and 20 and hook portions 26 and 27 are formed on the arms 22 and 23. The arms of the link are positioned between the arms of link 17 with the hook portions 24 and 25 extending about the body 21 of the link 17 while the hook portions 26 and 27 of the link 17 extend about the body portion 18 of the link 16. The inturned portion of the arms have their ends closely adjacent or meeting to hingedly connect the links together.

It will, of course, be understood that the links 16 and 17 alternate with each other in the series of links in the chain in order that their arms may be extended one between the other in intermeshing relation.

In Figures 7 to 10 inclusive the spaces between the links such as illustrated at 28 will not be closed but will leave an opening through which the surface on which band chain is placed may be viewed, if desired.

Figure 11:
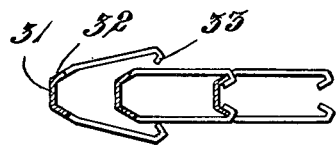
Figure 11 is a sectional side view of a modified form of construction showing the body plate and ends of the arms bent differently.

In Figure 11 the body portion 31 is bent as at 32 to form an overhanging portion from which the arms extend with their extremities 33 bent to hook under these overhanging portions as illustrated to strengthen the holding of the links together.

It will be observed that I have provided a simple construction of chain in which each of the links has a body or bar extending transversely thereof with arms extending longitudinally from the bar suitably formed at their ends to hingedly connect to the body of the next link. This construction is such that it may be made by machine operations and multiplied at will to provide a chain of the desired width and the desired length.

Figure 1:
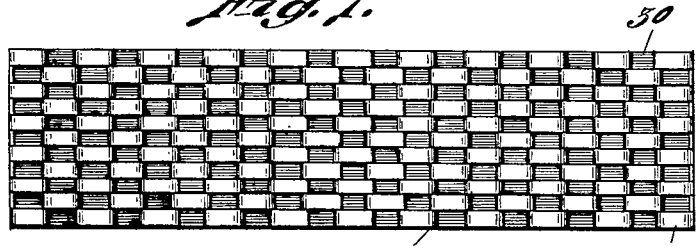
Figure 1 is a top plan view of a band chain embodying this invention.

It will, of course, be understood that where the chain is formed from links as illustrated in Figure 2 that each of the links is identical throughout the length of the chain and that to so position the arms of one link that they may properly engage with the next link, each link is alternated side for side so that the arms may be properly positioned, that is, with reference to Figures 1 and 2 the edge 30 is positioned first on one side and then on the other side of the band chain in adjacent links.

This chain may be made exceedingly small and have the appearance of mesh and may be formed from sheet stock by cutting the same and bending, all of which operations may take place automatically in the machine.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A band chain comprising a plurality of links each having a body part with a plurality of arms extending therefrom located in each of different parallel planes, the arms of one link being formed to direcly engage the body part of the next link to hingedly hold the links in assembled relation.

2. A band chain formed of a multiplicity of units, each having a sheet metal body in a plane extending transversely of the chain and spaced arms in each of a pair of parallel planes extending longitudinally of the chain, the arms of one link pivotally and directly engaging the body of the next link.

3. A band chain comprising a plurality of links, each having a body part with a plurality of laterally spaced parallel arms extending therefrom so positioned that the arms of one link are staggered in lateral relation to the contiguous arms of the next link and directly engage the body of the next link in the spaces between the arms thereof to hingedly connect the links together.

4. A band chain comprising a plurality of links, each having a sheet metal body part with two series of spaced arms extending therefrom, each series located in a different plane, said planes being parallel, the end portions of the arms of one link directly engaging the body of the next link in the spaces between the arms thereof to hingedly connect the links together.

5. A band chain comprising a plurality of links, each having a sheet metal body part in a plane at right angles to the length of the chain with a plurality of laterally spaced arms extending therefrom in spaced parallel planes at right angles to the plane of the body, hook portions on the ends of said arms directly engaging the body of the next link in the spaces between the arms thereof to hingedly connect the links together.

6. A band chain comprising a plurality of links, each having a body part with two series of spaced arms extending therefrom located in different parallel planes with the arms in one plane staggered with reference to the arms in the other plane, the end portions of the arms of one link directly engaging the body of the next link in the spaces between the arms thereof to hingedly connect the links together.

7. A band chain comprising a plurality of links, each having a body part with a portion disposed at right angles to the length of the chain and an overhanging portion extending therefrom, arms extending from said body each having its extremity formed to hook under the overhanging portion of the next link.

8. A band chain comprising a purality of sheet metal links each having a body part, spaced arms extending from each body part in parallel relationship, the arms of each link extending into the spaces between the arms of adjacent links to directly and hingedly engage the body part of the adjacent links and lock the links in parallel hinged relationship.

9. In a chain, a series of sheet metal links each link consisting of a transverse wall having a plurality of spaced arms projecting from one edge in a common plane at right angles to that of the transverse wall, said arms having a portion directly and hingedly interlocking with a transverse wall of a similar adjacent link.

10. In a chain, a series of sheet metal links each link consisting of a transverse wall having a plurality of spaced arms projecting from one edge in a common plane at right angles to that of the transverse wall, each of the arms terminating in a portion bent at right angles thereto so as to be parallel to said transverse wall.

In testimony whereof I affix my signature.

KARL C. AUGENSTEIN.